United States Patent [19]
Lönnö et al.

[11] Patent Number: 5,853,650
[45] Date of Patent: *Dec. 29, 1998

[54] METHOD OF MANUFACTURING BOAT HULLS IN A FEMALE MOULD

[76] Inventors: Anders Lönnö, Holländargatan 9A, S-111 26 Stockholm, Sweden; Petter Håkanson, Ekskogens gard, S-186 96 Vallentuna, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 750,964

[22] PCT Filed: Jun. 20, 1995

[86] PCT No.: PCT/SE95/00750

§ 371 Date: Dec. 20, 1996

§ 102(e) Date: Dec. 20, 1996

[87] PCT Pub. No.: WO95/35231

PCT Pub. Date: Dec. 28, 1995

[30] Foreign Application Priority Data

Jun. 20, 1994 [SE] Sweden .................................. 9402167

[51] Int. Cl.[6] ........................................................ B36B 5/24
[52] U.S. Cl. ..................... 264/511; 114/357; 264/225; 264/254; 264/255; 264/257; 264/258
[58] Field of Search ..................................... 264/258, 511, 264/219, 220, 225, 226, 227, 254, 255, 257; 114/357

[56] References Cited

U.S. PATENT DOCUMENTS

| | | |
|---|---|---|
| 2,569,224 | 9/1951 | Brown . |
| 2,617,126 | 11/1952 | Nebesar . |
| 2,909,791 | 10/1959 | Malary, Jr. . |
| 3,220,026 | 11/1965 | Lichti . |
| 3,439,366 | 4/1969 | Matthews . |
| 3,531,809 | 10/1970 | Hegg . |
| 3,591,443 | 7/1971 | Cox . |
| 3,709,178 | 1/1973 | Piker et al. ................................ 114/56 |
| 4,065,820 | 1/1978 | Starratt, Jr. . |
| 4,120,749 | 10/1978 | Humphrey .............................. 156/245 |
| 4,142,265 | 3/1979 | Pfleger . |
| 4,201,823 | 5/1980 | Russell .................................... 428/246 |
| 4,307,457 | 12/1981 | Wills ....................................... 367/173 |
| 4,563,321 | 1/1986 | Gessford ................................. 264/258 |
| 5,036,788 | 8/1991 | Unger ..................................... 114/355 |
| 5,117,764 | 6/1992 | Kretzer, Jr. ............................. 114/361 |
| 5,229,141 | 7/1993 | Mozer .................................... 264/257 |
| 5,266,249 | 11/1993 | Grimes, III et al. ................... 264/258 |
| 5,601,049 | 2/1997 | Hordis et al. .......................... 264/258 |

OTHER PUBLICATIONS

Patent Abstracts of Japan, vol. 12, No. 424, M–761 63–159191 (Nippon Hikoki K.K.), Jul. 2, 1988.

*Primary Examiner*—Mathieu D. Vargot
*Attorney, Agent, or Firm*—Jacobson, Price, Holman & Stern, PLLC

[57] ABSTRACT

A method of manufacturing boat hulls in a female mould. The hull includes a rigid reinforced plastic shell and at least one softer protective layer which is made from a plastic or rubber material and located on the outside of the shell. To provide the hull with a smoother outer surface and an improved adhesion between the shell and the layer, the layer is integrated in the hull when the hull is manufactured, by first applying the layer on the mould surface of the female mould and then building the structural shell on the layer and on free parts of the mould surface. The protective layer is accurately manufactured if it is cast moulded in a cast mould and if the female mould, or any other object that has been used when developing the female mould, is used for the cast moulding.

3 Claims, 2 Drawing Sheets

METHOD OF MANUFACTURING BOAT HULLS IN A FEMALE MOULD

TECHNICAL FIELD

The invention relates to a method of manufacturing boat hulls, in a female mould, i.e. a mould whose inner side is made to determine the shape of the hull. The hull is manufactured by applying material, for example glass fibre reinforced plastic, to the inner side of the female mould, the mould surface, and let the material harden to form a shell that is comprised by the load carrying structure of the hull. This shell may be a single shell or the outer shell of a sandwich construction.

STATE OF THE ART

According to customary technique, a boat hull can be manufactured by applying the material that will form said structural shell directly on the mould surface of the female mould. This can be made, for example, by spraying chopped glass fibres mixed with liquid plastic resin on the release agent treated mould surface in a layer that is varying in thickness depending on the strength requirements set up for different parts of the hull. Another way is by using hand lay-up technique which means that plastic resin impregnated fibre reinforcement material in the form of mats or weaves is applied in the mould In several layers. Air voids and excessive resin is taken away by the use of a roller.

After the material has been applied In the mould, it is allowed to cure and the rigid structural shell is formed. The outer surface of the shell will thus be determined by the shape of the mould. To achieve a smoother surface In a desired colour, normally a surface layer, for example gelcoat, is sprayed on the mould surface before the reinforcement provided resin is applied. The gelcoat layer and the reinforced plastic form together the rigid structural shell.

A hull made in this manner has a good structural strength. The hard structural shell is however sensitive to wear and crushing loads. It is customary that the hull can be protected from this sort of loads by attaching a sheet of rubber material on the bottom surface of a finished hull. If a proper material is used, a very effective protection can be obtained. The fatal pressure that a point shaped object like the tip of a stone may create on the naked surface of the hull, is by the rubber sheet distributed to a larger area of the hull and by that becomes harmless. By using a sufficient thickness of the rubber sheet and a highly elastic and wear resistant material, the risk for crushing and wear damages is decreased significantly. However, a boat that is supplied with such a rubber sheet attached to the hull has the following disadvantages:

- The sheet does not stick sufficiently to the hull. Air voids between the sheet and the hull remaining from the glueing operation of the sheet might later cause debonding.
- Transition sections formed between the sheet and the hull causes irregularities in the hull surface. These cause losses in speed and reduction of the service range. In addition these irregularities provide points of action for e g rocks etc. to catch and then tear the sheet off.
- Accurate shaping of the sheets and a correct attachment of them are time consuming and costly.
- Variations in the thickness of the sheets result in unevenness of the surface of the boat which reduces the performance of the boat.
- The sheets cannot always be formed according to the shape of the hull since an effective material should not be too elastic.

DESCRIPTION OF THE INVENTION

Technical problem

The object of the invention is to provide an improved method to manufacture plastic boats having a rigid shell in a female mould without having the disadvantages above. Specially for landing crafts the following requirements are called for:

- The boats should, without being damaged, be able to land at stony shores to disembark troops. In addition the boats must be able to easily come off the shores.
- The boat hulls shall be light in order to enable a high speed, and strong in order to make the boats seaworthy and to withstand rough handling.
- The hull of the boats must have a smooth bottom surface in order not to have unnecessary hydrodynamic resistance which will reduce the speed and service range.

The solution.

According to the invention there is proposed that at least one outer protective layer of a material that is softer and more elastic than the material of the structural shell, such as a highly elastic and wear resistant plastic or rubber material, is integrated into the rigid shell when the hull is manufactured. This is accomplished by Introducing the elastic protective layer to the prospective hull already at the initial phase of the manufacturing process, i.e. before the rigid structural layer within is applied, by first applying the elastic layer in the female mould and then applying the rigid structural shell on the top of the elastic layer.

The elastic layer, that does not have to be limited to certain parts of the hull, but that preferably is used in those pans of the hull that are subjected to damages, can be applied by spraying material in corresponding areas of the hull. For example, masking tape or limiting devices are in advance attached to the mould surface around these areas. The height of the limiting devices are best corresponding to the desired thickness of the layer at the limiting devices. After the elastic layer has been built up, the limiting devices can be removed and the rigid structural layer is applied on the elastic layer and the remaining parts of the mould surface that determines the shape of the hull. The limiting devices can also be left in the mould and become a part of the elastic Layer. If an elastic material that is stiffer than the protective material is used for these limiting devices, an advantageous gradual transition between the rigid shell and the protective layer is obtained. By using this procedure the hull mould is not only used for the manufacturing of the structural skin but also for the modelling of the protective layers.

The elastic layer can also be applied by attaching premade elements to the mould. These elements can be cut out from sheets, cast moulded elements that are suitable for the protection of e g the shell plating at the bow, or extruded profiles for protection of sensitive edges of the hull, such as the keel, lower part of the transom and the chine of planing boats.

The prefabricated protective layers may be cast moulded elements, where, at least in one phase of the manufacturing process, either the female mould or a component like a plug that has been made during the development of the female mould, is used as in the case of spraying material. The cast moulding of an element can be made in a cast mould that consists of two dismountable main parts, usually two cast mould parts that has been manufactured by the use of the above said parts.

The first cast mould part is suggested to be manufactured by making at first a model of the element which is fixed on the appropriate place of the female mould. After that, a shell, that will form this pan of the cast mould and which will have a shape determined by the model and an area of the mould surface around the model, is manufactured. The second cast mould part is manufactured by carrying out a second shell in a shape determined by the corresponding surface on said plug or a moulding from the part of the female mould that has been used for the manufacturing of the first cast mould part above.

To ensure a correct location of the limiting devices and elastic layers during the manufacturing of the layers and the manufacturing and curing of the structural shell, they have to be kept carefully in the mould. The hold can be secured e g by using double coated tape or vacuum distributed, for example, through holes. In the first case the placement of the layers can be made by the use of vacuum, e g. by covering the layer and free parts of the surrounding mould surface, with a sheet sealed to this surface. When the vacuum is applied beneath the sheet, the layer will be pressed to the tape, and a firm hold will be obtained. In the second case the vacuum will be used both for the placing at the appropriate locations and for the hold of these layers.

Also after the rigid structural layer and possible remaining parts of a sandwich construction are applied, it might be advantageous, in order to stabilise and remove air, to use a vacuum assisted procedure. Immediately after the material is applied in the female mould it is covered by a sheet or film, and the vacuum is connected to the space beneath the film. By this a very good bond between the rigid shell and the elastic layer is obtained. Since the rigid shell has been given a shape which makes allowance for all irregularities in the surface and thickness of the elastic layer, a very smooth outer surface on the elastic layer is obtained. By the method of the invention, the rigid shell will hold out or pull in the elastic layer so that the smooth surface that is determined by the mould will remain even after the hull is removed from the mould.

Advantages

Tests have shown that a very good adhesion between the elastic layer and the rigid structural shell is obtained if the latter is allowed to cure in contact with the elastic layer. The delamination risk is reduced significantly. The method according to the invention enables that adhesive and other chemicals that in the long term could affect the hull material can be avoided. Still the method does not prevent the use of these chemicals.

- A very smooth surface is obtained for the hull. All errors caused by bad cutting to length of sheets etc is filled out and corrected by the rigid structural layer that is formed with regards to these errors. Protruding edges of the sheets that can be starting points for tear-off are avoided.
- The method is effective in serial production. Short time is needed for cutting to length etc.
- Existing moulds can be used. The hull will get the desired shape on the outside already when the manufacturing is started. The mould surface can, according to the invention, be used also for the determination of the shape of the protective layer.
- The hull gets a good surface finish without post trimming.
- The elastic layer gets very effective since it is well attached at the edges and gets good support by the rigid structural layer.
- Landing crafts made from plastic material have been subjected to said damages. If they are manufactured according to the invention, they can be run right up on a rocky shore still intact. If the protective layers are made from a material with low coefficient of friction like polyurethane, and a good adhesion between the protective layer and the rigid structural shell is obtained, the bow of the boat can easily slip off the landing place when the boat should be removed from the shore.

DESCRIPTION OF THE FIGURES

A preferred method will now be described in more detail with reference to the accompanying figures. The same reference numbers represent corresponding parts in the different figures.

PREFERRED CARRYING OUT

Figure 1:
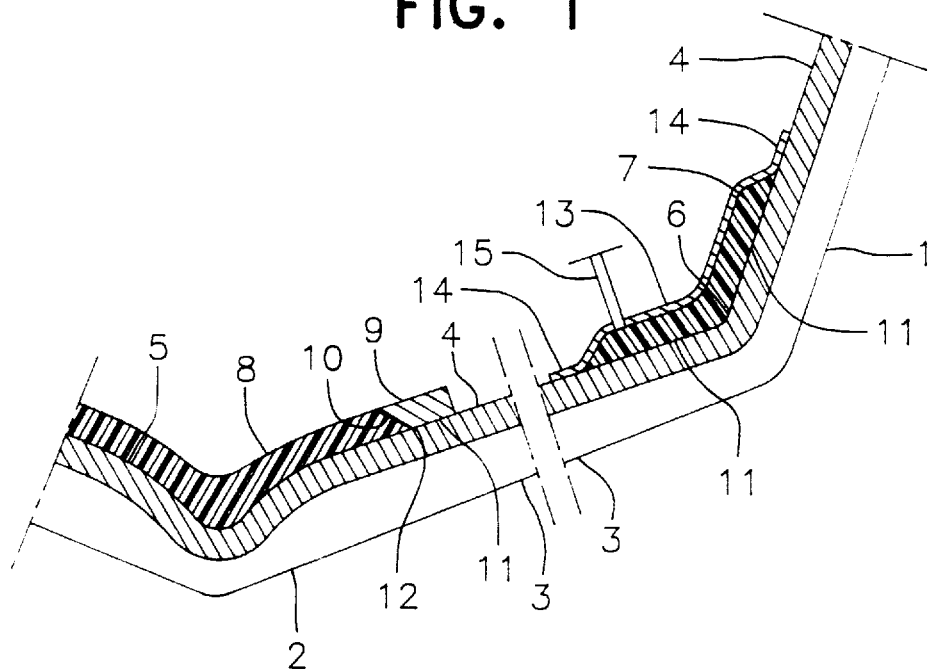
FIG. 1 shows a cross-sectional view of two parts of a female mould after layers of elastic material been applied in the mould surface of the female mould.
Figure 2:
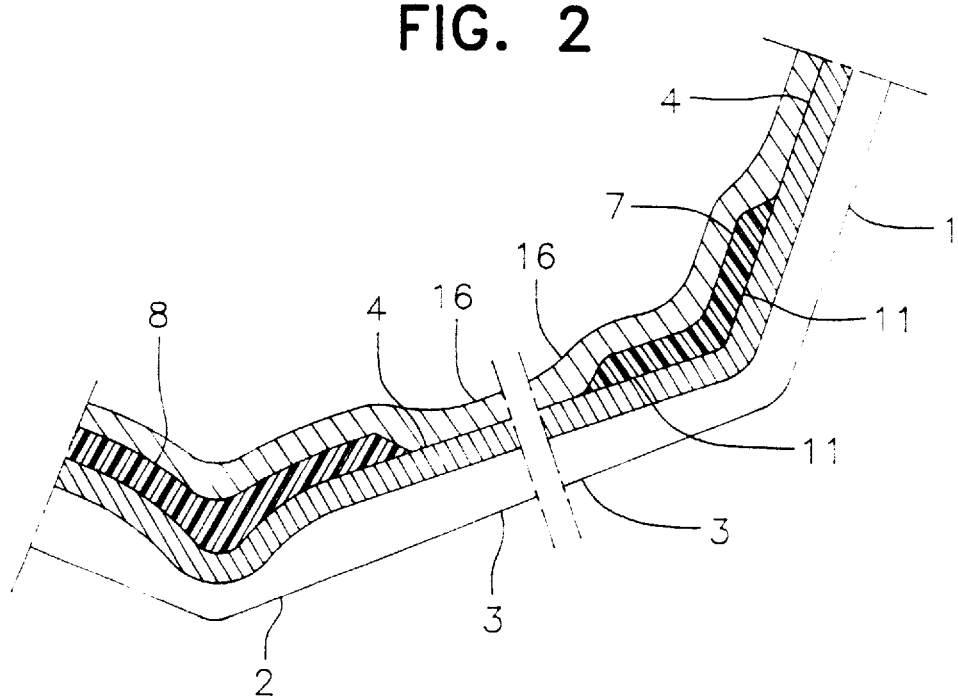
FIG. 2 shows the same female mould when also the material forming the structural shell has been applied on the elastic layers and on the mould surface.

In the FIGS. 1 and 2 the preferred method according to the invention, to manufacture motor boat hulls with chines is illustrated. To simplify the illustration the manufacturing of a single skin hull is shown, but manufacturing of the outer skin of a sandwich hull can be proceeded similarly. In FIGS. 1 and 2 the reference numbers 1 and 2 represent different parts of the same boat mould 3 which is shown in a cross-sectional view. The boat mould is a female mould, which means that its inner surface 4 is used for giving shape to the boat hull. Boats with this type of hull have similarly to other boats of the same type, two types of areas along the whole length or a part of the length of the boat, which are especially subjected to damage, the keel area, whose shape is determined by the corresponding part of the mould surface, the keel mould surface 5 and the two areas for the chines, whose shapes are determined by corresponding parts of the mould surface, the chine mould surfaces of which one is shown with reference number 6.

In the figures, also in a cross-sectional view, two from each other separated protective layers, 7 and 8, made from an elastic material such as urethane rubber, are shown. The layer 7 for the chine area is premade e g by extrusion or cast moulding. The layer is made as a band with a cross-section that has the shape of an evenly thick hook with an obtuse angle, of which the tip will form the chine edge of the boat.

The layer 8 for the keel area has been applied by first spraying material on the keel mould surface 5 and then spraying on the already applied material until the layer has the desired thickness. The extension of the layer is determined by limiting lists 9 whose height is correlating to the desired thickness of the layer. The edges of the layer get a functional shape if the limiting surface 10 of the lists is e g tilted towards the mould surface. The protective layer thus obtains an advantageous wedge shaped edge. By means of the method of the invention, protective layers with a desired outer shape are obtained directly. By using a proper treatment of the mould surface, the layers normally get a sufficient temporary grip in order not to lose position during the construction phase of the structural shell.

The manufacturing of the hull is started by applying these protective layers in the female mould. As in a customary technique the mould surface is first treated with an release agent. Before this treatment, fixing strips 11 made from double coated tape with protective paper are applied on the mould surface in order to temporarily keep in place during the manufacture of the hull the protective layers 7 for the chine areas, the protective layer 8 for the keel area and the limiting lists 9. When the release agent is dry, the protective paper is peeled off the fixing strips and said protective layers and lists are applied to the intended places on the mould surface by pressing them against the fixing strips. Since the protective layers for the chine areas are elastic, they are formed to connect tightly to the mould surface even if the angle of the chines is not constant along the hull. The protective layer 8 for the keel is applied in the same way (see FIG. 1).

Finally the limiting lists 9, which have been release agent pre-treated on all surfaces except the surface 12 that will be attached to the mould surface, as well as with the fixing strips, are torn off when the protective layers are half cured. When the superfluous material has been cut away from the protective layers and the remaining spots on the mould surfaces beneath the removed limiting lists have been release agent treated, the first part of the manufacturing is finished.

Figure 3:
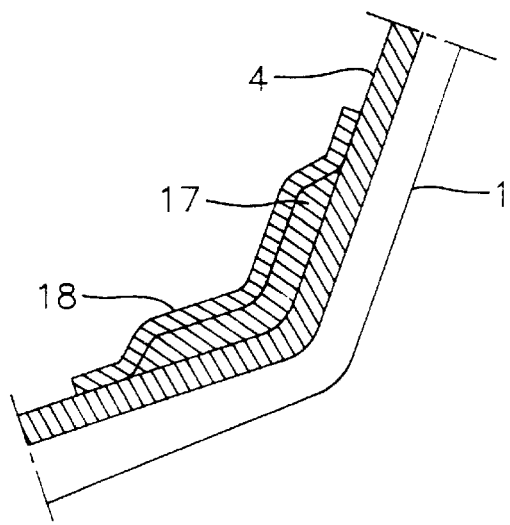
FIGS. 3 and 4 show in a cross-sectional view the manufacturing of the cast mould parts to be used for the cast moulding of a layer or element for the chine of the boat.
Figure 4:
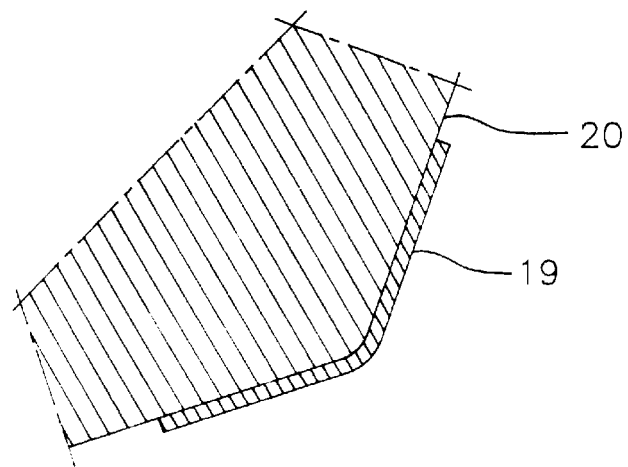

As an example of a cast moulding, the preferred method to manufacture the protective layers 7 for the chine areas is chosen. The method is however representative for any other protective layer. The FIGS. 3 and 4 shows the manufacturing of a cast mould for the purpose made from two cast mould parts. A model 17 of one of the layers is constructed and placed at the appropriate locality in the female form. The model can be made from cellular plastics, curing putty or other material that is easy to work, and is attached to the mould surface 4 similarly to the protective layer 7. Then a first cast mould part 18 is constructed by laying a layer of glass fibre reinforced plastics directly on the model and on a surrounding area of the mould surface outside the model in order to form a flange (see FIG. 3).

Figure 5:
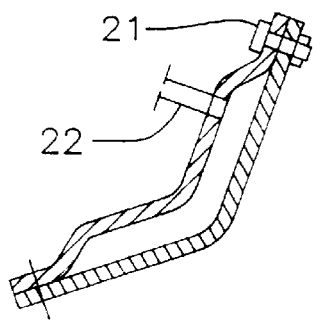
FIG. 5 shows a cross-sectional view of the cast mould parts from FIGS. 3 and 4 put together to form a cast mould.

A second mould part 19 is manufactured by laying up another layer of the same material directly on the relevant surface 20 of a plug. The mould part is made big enough to reach the outer contour of the first cast mould part 18 when the two mould parts are put together with matching surfaces meeting. The cast mould parts are joined to each other in this position by using a number of equal distance distributed screws and nuts 21 along the circumference of the mould, see FIG. 5. One of the mould parts is supplied with an inlet device 22 for cast moulding material. After the cast moulding is finished, the newly moulded material is cured in the cast mould for a certain time at a certain elevated temperature. By this procedure the material can obtain the desired good properties.

As mentioned in the introduction, the attachment of the protective layers and lists can be improved by the use of vacuum assistance. In the preferred method, a sheet 13 is used that covers one protective layer 7 and is sealed along the free parts 14 of the mould surface that are around the layer. Vacuum is applied to the space beneath the sheet through a tube 15. Thus the layer is pressed to the mould surface and the fixing strips 11. The sheet can be removed or be left in order to be integrated into the reinforcement of the structural shell.

During the second phase, the structural shell 16 is manufactured. This is laid up directly on the protective layers 7, 8 and on the mould surfaces 6 which are still free (see FIG. 2). The lay up is made in a customary way and is therefore not described. A good result is obtained if vacuum is used in this phase as well. Right after the lay up of the structural shell is finished, it is covered by a sheet that encloses the protective layers and the shell between the sheet and the mould. By means of vacuum that is applied as described in the previous paragraph, air voids and excessive matrix are effectively removed at the same time as a good connection between layers and the shell is obtained during the curing phase. Thus a good bond is achieved between the layers regarding the shaping and the adhesion between these things.

We claim:

1. A method of manufacturing a boat hull made in a female mould, said boat hull comprising a rigid structural shell made from reinforced plastics and, located upon said rigid structural shell is a protective layer made from plastic or a rubber material that is softer and more elastic than the reinforced plastics of the rigid structural shell, the protective layer being manufactured by cast moulding in a cast mould comprising two cast mould parts, one of said two cast mould parts being made by applying a layer of material directly on a particular portion of a plug for said female mould of said boat hull and the other of said two cast mould parts being made by applying a layer of material on a model of the protective layer, joining said two cast mould parts together and forming the protective layer between said two cast mould parts removing the protective layer from the cast mould and applying the protective layer to an inner surface of the female mould for said boat hull corresponding to the plug portion, whereafter the structural shell is made upon the protective layer and free parts of the inner surface of said female mould.

2. The method according to claim 1, wherein vacuum is used to temporarily keep said protective layer in place on the female mould.

3. The method according to claim 1, wherein fixing strips made from double coated tape are used to temporarily keep said protective layer in place on the female mould.

* * * * *